United States Patent
Newman

[11] 3,982,958
[45] Sept. 28, 1976

[54] NON-AQUEOUS BATTERY SYSTEM
[75] Inventor: Gerald Henry Newman, Strongsville, Ohio
[73] Assignee: Union Carbide Corporation, New York, N.Y.
[22] Filed: May 9, 1974
[21] Appl. No.: 468,265

Related U.S. Application Data
[63] Continuation of Ser. No. 211,305, Dec. 23, 1971, abandoned.

[52] U.S. Cl.................................. 429/57; 429/194
[51] Int. Cl.² ......................................... H01M 6/16
[58] Field of Search.................. 136/64 N, 136, 137, 136/154

[56] References Cited
UNITED STATES PATENTS
3,060,255  10/1962  Lozier............................. 136/137
3,508,966   4/1970  Eisenberg....................... 136/64 N FOREIGN PATENTS OR APPLICATIONS
23,572  7/1961  Japan................................. 136/155

OTHER PUBLICATIONS
JACS 71, 2694 (1949), pp. 2694–2695 only.

Primary Examiner—John H. Mack
Assistant Examiner—H. A. Feeley
Attorney, Agent, or Firm—Eugene Lieberstein

[57] ABSTRACT

The invention relates to the use in a non-aqueous battery system of an electrolyte comprising a solute dissolved in a solvent of nitrobenzene or a substituted nitrobenzene compound.

12 Claims, 3 Drawing Figures

U.S. Patent  Sept. 28, 1976  3,982,958
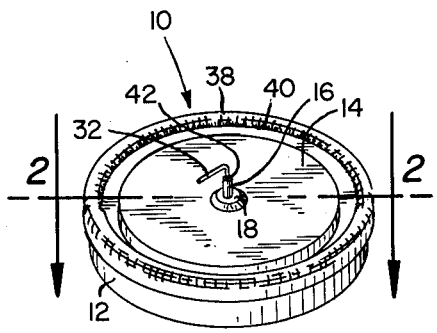
F I G. 1.
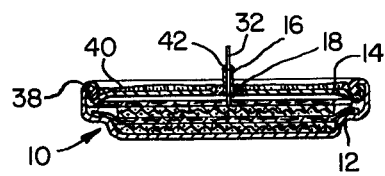
F I G. 2.
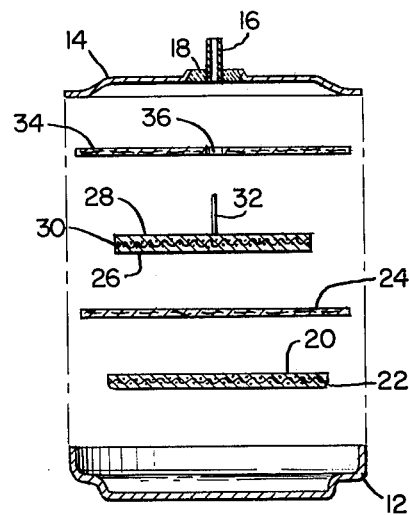
F I G. 3.
INVENTOR
GERALD H. NEWMAN
BY Michael A. Caputo
ATTORNEY

NON-AQUEOUS BATTERY SYSTEM

This is a continuation of application Ser. No. 211,305 filed Dec. 23, 1971, now abandoned.

This invention relates to electrochemical batteries and more particularly relates to electrolytes for primary and secondary non-aqueous electrochemical batteries.

The development of high energy battery systems requires the compatibility of an electrolyte possessing desirable electrochemical properties with highly reactive anode materials, such as sodium and lithium, as well as the efficient use of high energy density cathode materials, such as nickel fluoride. The use of aqueous electrolytes is precluded in these systems since the anode materials are sufficiently active to react with water chemically. It has therefore been necessary, in order to realize the high energy density obtainable through use of these highly reactive anodes and high energy density cathodes, to turn to the investigation of non-aqueous electrolyte systems and more particularly to non-aqueous organic electrolyte systems.

The term "non-aqueous organic electrolyte" as used herein refers to an electrolyte which is composed of a solute, such as a salt or a complex salt of Group I-A, Group II-A or Group III-A elements of the Periodic Table, dissolved in an appropriate non-aqueous organic solvent. Preferably the solute is one which displays Lewis acid-electron acceptor characteristics. The term "Periodic Table" as used herein refers to the Periodic Table of the Elements as set forth on the inside back cover of the Handbook of Chemistry and Physics, 48th Edition, The Chemical Rubber Company, Cleveland, Ohio, 1967–1968.

A multitude of solutes is known and suggested for use but the selection of a suitable solvent has been particularly troublesome. The ideal battery electrolyte would comprise a solvent-solute pair which have a long liquid range, high ionic conductivity, and stability. A long liquid range, i.e., high boiling point and low freezing point, is essential if the battery is to operate at other than normal ambient temperatures. High ionic conductivity is necessary if the battery is to have high rate capability. Stability is necessary with the electrodes, the materials of construction, and the products of the cell reaction to provide long shelf life when used in primary and secondary battery systems.

Most non-aqueous organic electrolytes have been deficient in one or more of these properties. For example, an organic liquid which displays high ionic conductivity will many times be unsuitable for use due to instability in the presence of highly reactive materials present in the battery.

The compound nitrobenzene, for example, was previously investigated as a solvent for electrolyte use and it was found that certain combinations of solutes dissolved in nitrobenzene displayed high specific electrical conductivity which led to the suggestion that nitrobenzene be used as a solvent for electroplating. However, nitrobenzene and certain of its derivatives are generally considered as cathode depolarizers and, apparently for this reason, they have never been suggested for use as electrolyte solvents in a battery, and more particularly, in a battery containing highly reactive components.

It has now been found, surprisingly, that nitrobenzene and substituted nitrobenzene compounds are excellent electrolyte solvents for non-aqueous battery systems.

Nitrobenzene is a liquid over the temperature range 5.7 to 210.9°C. It is stable in the presence of the materials of battery construction, even those which are normally considered to be highly reactive. Additionally, rechargeable battery systems containing nitrobenzene have displayed good efficiency on charge and have been capable of being charged at 10 volts with no gassing or apparent decomposition of the nitrobenzene.

While the theory of the present invention is incomplete at present, and applicant does not desire to be bound by any theory of invention, it appears that it is the absence of water or any other proton donor from the non-aqueous system which renders the nitrobenzene compound difficult to reduce and thus stable in the system. It is, therefore, essential that batteries in accordance with the present invention do not contain and are sealed against even small quantities of moisture. Additionally, to optimize shelf life and keep anode corrosion to a minimum, it is desirable to exclude both hydroxide ions and labile protons from the system.

In accordance with the present invention there is provided a non-aqueous battery system comprising an anode and cathode at different potentials and an electrolyte of a solute dissolved in a solvent of nitrobenzene or a substituted nitrobenzene compound.

A better understanding of the invention may be had by reference to the following detailed description of one embodiment thereof taken in connection with the accompanying drawings wherein:

FIG. 1 is a perspective view of a cell in accordance with the present invention;

FIG. 2 is a cross-sectional view taken along line 2—2 of FIG. 1; and

FIG. 3 is an exploded cross-sectional view showing the assembly sequence used to fabricate the cell of FIG. 1.

Referring in detail to the drawings there is shown a round, flat cell generally designated 10, formed in a metal can comprising a base 12 and a top 14. The can top 14 has a tube 16 passing through its center and electrically insulated from the remainder of the top by a non-conductive ceramic fitting 18.

The cell elements are stacked in the can base 12 and include, in the order of assembly, a cathode componet such as silver chloride 20 carried on a metal screen 22 for support; a separator 24 such as a glass fibre mat; an anode component of two sheets of lithium metal 26,28 pressed into opposite sides of a metal screen 30 with a wire lead 32 extending upwardly from the center thereof; and a second separator 34 of glass fibre mat having a central hole 36 which registers with the wire lead 32 of the anode component.

Assembly of a finished cell merely requires stacking each of the components in the order recited above and positioning the top 14 on the base 12 with the wire lead 32 extending through the hole 36 of the second separator 34 and the tube 16 of the top 14. Once the top 14 is in place a crimp 38 may be formed in the base to secure the components together and a solder seal 40 may be formed around the periphery of the cell to insure a liquid- and gas-tight closure. An electrolyte solution, such as a 1 molar solution of lithium aluminum tetrachloride in nitrobenzene, may be vacuum impregnated into the cell through tube 16 which can be sealed by solder 42.

The cell can be discharged by contact with the base 12 which serves as the cathode collector and the wire lead 32 which serves as an anode contact.

The type of cell construction described above lends itself to simple fabrication techniques and is susceptible of relatively minor changes for low-cost automated assembly.

Useful anode materials in the battery of the present invention include the alkali metals or alkaline earth metals and alloys of alklai metals or alkaline earth metals with each other or other metals. As used herein the term "alloy" is meant to include mixtures, solid solutions such as lithium-magnesium and intermetallic compounds such as lithium monoaluminide. The preferred anode materials are lithium, sodium and potassium.

The selection of a cathode material is not narrowly critical and any of the known cathodes for non-aqueous systems, if compatible, can be used in the battery of the present invention. One of the criteria for compatibility is that the cathode material be substantially insoluble in the electrolyte solvent. Useful cathode materials include halides, such as silver chloride, nickel fluoride, cadmium chloride, lead chloride, cadmium fluoride, cuprous chloride, cupric fluoride, lead difluoride, lead tetrafluoride, silver monofluoride, silver difluoride, and cupric chloride; sulfides, such as cupric sulfide; and oxides, such as silver oxide, cupric oxide, manganese dioxide, mononickel oxide and lead oxide. Of these, the preferred cathode materials are silver chloride, cupric chloride, cuprous chloride, nickel fluoride, cadmium chloride, lead chloride, cupric fluoride, and cadmium fluoride.

The electrolytes of the present invention comprise a solute dissolved in a solvent which is nitrobenzene or a substituted nitrobenzene compound.

Preferred solutes are complexes of inorganic or organic Lewis acids and inorganic ionizable salts. The only requirements for utility are that the complex be compatible with the solvent being employed and that it yield a solution which is ionically conductive. According to the Lewis or electronic concept of acids and bases, many substances which contain no active hydrogen can act as acids or acceptors of electron doublets. The basic concept was set forth in the chemical literature, i.e., Lewis, G.N., Journal of the Franklin Institute, Volume 226, July–December 1938, pgs. 293–313. A suggested reaction mechanism for the manner in which these complexes function in an organic solvent is described in detail in U.S. Pat. No. 3,542,602 wherein it is suggested that a solute of the Lewis acid type, i.e., able to accept one or more electron doublets will form an addition complex with an organic solvent and, in a second step, an inorganic ionizable salt may be reacted with said complex to form a second complex which is more stable than the first complex.

Typical Lewis acids suitable for use in the present invention include boron bromide, aluminum chloride, aluminum bromide, boron fluoride and boron chloride.

Ionizable salts useful in combination with these Lewis acids include, lithium fluoride, lithium chloride, lithium bromide, sodium fluoride, sodium chloride, sodium bromide, potassium fluoride, potassium chloride, and potassium bromide. It will be obvious to those skilled in the art that double salts formed by a Lewis acid and an inorganic ionizable salt may be used directly or the Lewis acid and ionizable salt may be added separately. One such double salt, for example, is that formed by the combination of aluminum chloride and lithium chloride to form lithium aluminum tetrachloride.

The electrolyte solvent of the invention is nitrobenzene or a substituted nitrobenzene compound and would conform to the general formula

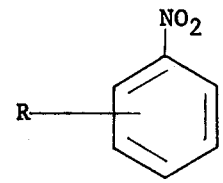

wherein R is hydrogen, a halogen, an alkyl group of 1 to 5 carbon atoms, an alkoxy group of 1 to 5 carbon atoms, sulfur, an N-alkyl substituted amino group, or a nitro group. Examples of such compounds are nitrobenzene, 2-nitrotoluene, 0-chloronitrobenzene, and p-methylisopropyl nitrobenzene.

Also useful will be nitrobenzene derivatives which are normally solid at ambient temperature. These compounds may be dissolved in aromatic solvents such as benzene, toluene or nitrobenzene itself to yield an electrolyte solvent in liquid form. An example of such a material is p-fluorinitrobenzene dissolved in benzene. The electrolyte solute can be dissolved in this liquid system to yield the complete electrolyte solution.

It will be obvious to those skilled in the art that useful cells in accordance with the present invention can be made by the techniques of construction generally practiced, provided precautions are taken to insure the absence of moisture. Such cells can be formed in any shape or size for a particular purpose and the method of packaging is not critical to the invention so long as the finished cell is sealed against moisture.

The following examples are illustrative of the present invention and are not intended, in any manner, to be limitative thereof.

EXAMPLE 1

A test cell was constructed in a rectangular polytetrafluoroethylene trough having two slots spaced one-half inch apart to accommodate an anode and a cathode. A sheet of lithium metal pressed into a nickel screen was the cell anode and the cathode, which consisted of silver chloride on a nickel screen, was charged to a total capacity of 440 milliampere-hours. The cathode had a nominal surface area of 10 square centimeters. The electrolyte consisted of a solution of about 11 weight per cent lithium aluminum tetrachloride in nitrobenzene. The charge was begun at a rate of 2.0 milliamperes per square centimeter and a voltage of 3.5 volts. When the terminal voltage rose to 4 volts the charging rate was cut back to 0.25 milliampere per square centimeter and the last 60 milliampere-hours of charge were completed at a flat 3.5 volts.

At a discharge rate of 1.0 milliampere per square centimeter this cell delivered 370 milliampere-hours at a voltage of 2.6–2.5 volts and 20 milliampere hours at a voltage of 2.5–2.0 volts.

EXAMPLE 2

The cell of Example 1 was consecutively charged and discharged. On the twelfth cycle the cell was charged at a rate of 0.2 milliampere per square centimeter to a capacity of 47 milliampere-hours, at 0.3 milliampere per square centimeter for 74 milliampere-hours and at 0.4 milliampere per square centimeter for 120 milliampere-hours. The total charge capacity of 241 milliampere-hours was completed at 3.4–3.5 volts.

On discharge of the twelfth cycle of this cell at a rate of 1 milliampere per square centimeter, the cell delivered 220 milliampere-hours at a voltage of 2.6–2.5 volts and 150 milliampere-hours at a voltage of 2.5–2.0 volts.

EXAMPLE 3

A cell similar to that of Example 1 was cycled. This cell employed a lead chloride cathode in place of the silver chloride of Example 1 and, on its fourth charge-discharge cycle, was charged at a rate of 0.5 milliampere per square centimeter to a capacity of 115 milliampere-hours at 3.1–3.3 volts.

The cell was discharged at a rate of 0.2 milliampere per square centimeter and delivered 42 milliampere-hours at a voltage 2.3–2.0 volts.

EXAMPLE 4

A cell similar to that of Example 1, but employing a cuprous chloride cathode, was charged at a rate of 0.4 milliampere per square centimeter at 3.0–3.8 volts to a total capacity of 425 milliampere-hours.

This cell, when discharged at a rate of 1.1 milliampere per square centimeter, delivered 420 milliampere-hours at a voltage of 2.5–2.0 volts.

EXAMPLE 5

The cell of Example 4 was operated through 10 charge-discharge cycles. On the tenth cycle the cell was charged at a rate of 0.8 milliampere per square centimeter at 3.0–3.8 volts to a total capacity of 205 milliampere-hours.

On discharge, at a rate of 1.1 milliampere per square centimeter, the cell delivered 160 milliampere-hours at a voltage of 2.6–1.8 volts.

EXAMPLE 6

A sealed cell was formed in a nickel can comprising a cup-shaped base and a flat lid. The lid included a ceramic fitting having a metal tube extending therethrough and electrically insulated from the remainder of the lid. A cathode comprising cuprous chloride deposited on a substrate of nickel screen was positioned in the base of the cell and was covered by a glass fibre mat separator. The anode consisted of two sheets of lithium metal pressed on opposite sides of a nickel screen and having a wire lead extending from the center thereof. The anode was covered with an additional glass fibre mat with the lead wire extending therethrough. The lid was positioned on the base, crimped in place and soldered at the crimp with the lead wire passing through the tube in the lid. The cell was vacuum impregnated through the tube with an electrolyte consisting of a solution of about 11 per cent by weight lithium aluminum tetrachloride in nitrobenzene. The tube was sealed and contacts were attached to the lead wires and base.

The cuprous chloride cathode had been charged to a capacity of 238 milliampere-hours and, when discharged at a rate of 0.5 milliampere per square centimeter, delivered 155 milliampere-hours at a voltage of 2.5–2.0 volts.

EXAMPLE 7

A cell similar to that of Example 6 but employing a silver chloride cathode having a capacity of 163 milliampere-hours, when discharged at a rate of 1.0 milliampere per square centimeter, delivered 140 milliampere-hours at a voltage of 2.6–2.0 volts.

EXAMPLE 8

A number of cells employing anodes of lithium metal sheet, cathodes of various mixtures of conductive carbon and nickel fluoride, fibre glass separators and an electrolyte of 11.0 per cent by weight aluminum chloride and 2.75 per cent by weight lithium chloride in 86.25 per cent by weight nitrobenzene were prepared. Cathode compositions and discharge data for these cells are shown in Table I.

TABLE I

| Cell No. | Wt.$NiF_2$ (grams) | Wt.Ratio C:$NiF_2$ | Discharge Results Li Anode vs. $NiF_2$ Cathode Cell Capacity Theoretical (mA-hr) | Cell Capacity Actual (mA-hr) | Cathode Efficiency (%) |
|---|---|---|---|---|---|
| 1 | 0.12 | 4:1 | 66.5 | 51.1 | 77.5 |
| 2 | 0.08 | 4:1 | 44.3 | 44.4 | 100.5 |
| 3 | 0.08 | 4:1 | 44.3 | 48.4 | 109.0 |
| 4 | 0.15 | 3:1 | 83.0 | 50.4 | 60.5 |
| 5 | 0.10 | 3:1 | 55.4 | 60.0 | 108.0 |
| 6 | 0.10 | 3:1 | 55.4 | 52.8 | 93.8 |
| 7 | 0.20 | 2:1 | 110.0 | 49.6 | 44.8 |
| 8 | 0.13 | 2:1 | 72.4 | 58.1 | 80.5 |
| 9 | 0.13 | 2:1 | 73.6 | 50.3 | 68.5 |
| 10 | 0.30 | 1:1 | 166.0 | 48.7 | 29.4 |
| 11 | 0.20 | 1:1 | 111.0 | 45.0 | 40.5 |
| 12 | 0.20 | 1:1 | 110.8 | 33.2 | 30.0 |
| 13 | 0.22 | 4:1 | 120.0 | 115.0 | 95.8 |
| 14 | 0.22 | 4:1 | 120.0 | 110.0 | 91.6 |

Certain of the cells of Table I indicate an actual cell capacity greater than the theoretical capacity of the cells. This is attributed to the presence of impurities in the conductive carbon and in the cathodes. These impurities added a small amount of capacity to the cells and account for the efficiencies above 100 percent.

EXAMPLE 9

A test cell was prepared employing a lithium metal sheet anode, a nickel fluoride cathode and an electrolyte formed by dissolving 50 grams of p-fluoronitrobenzene in 10 milliliters of benzene and subsequently dissolving in this liquid 7.1 grams of aluminum chloride and 1.6 grams of lithium chloride. This cell was discharged at a current drain of 1 milliampere per square centimeter and delivered 35 milliampere-hours at a voltage level of about 2.9 volts.

EXAMPLE 10

A cell in accordance with Example 9, but employing 2-nitrotoluene as the electrolyte solvent delivered about 20 milliampere-hours on a current drain of 1 milliampere per square centimeter at a voltage level of about 2.9 volts.

EXAMPLE 11

A cell employing a lithium metal anode, a nickel fluoride cathode and an electrolyte of 8.2 per cent by weight aluminum bromide and 1.3 per cent by weight lithium chloride in 90.5 per cent by weight nitrobenzene was capable of discharge on a 1 milliampere per square centimeter drain for a capacity of 20 milliampere-hours to a 1.8 volt cutoff. The voltage level at the start of discharge was 2.9 volts.

EXAMPLE 12

A test cell was fabricated from a sodium metal anode, a nickel fluoride cathode and an electrolyte of 11.0 per cent by weight aluminum chloride and 2.75 per cent by weight lithium chloride in 86.25 per cent by weight nitrobenzene. This cell was discharged on a 1 milliampere per square centimeter drain to 54 per cent of its capacity, for a measured cell capacity of about 35 milliampere-hours, to a cutoff of 1.8 volts. The voltage level during discharge was about 2.6 volts.

EXAMPLE 13

A test cell similar to that of Example 12 was prepared except that lithium monoaluminide was substituted for the sodium anode. This cell discharged at about 2.5 volts for eleven hours delivering 55 milliampere-hours to a cutoff voltage of 1.8 volts.

EXAMPLE 14

Test cells similar to those of Example 11 but employing boron chloride and lithium chloride as the electrolyte solutes discharged at about 3.3–2.7 volts for about 20 hours on a 1 milliampere per square centimeter drain.

From the above it will be obvious to those skilled in the art that nitrobenzene and substituted nitrobenzene compounds will be useful as electrolyte solvents in non-aqueous battery systems employing a wide variety of anodes, cathodes and electrolyte solutes and will be useful in various types of battery construction for a multitude of uses.

Further, it will be obvious that, while the present invention has been set forth in some detail and described with particularity, it is susceptible to changes, modifications and alterations without departing from the scope of the invention as defined herein.

What is claimed is:

1. A hermetically sealed non-aqueous battery system comprising a highly active anode selected from the group consisting of the alkali metals, alkaline earth metals and alloys of alkali metals and alkaline earth metals with one another or other metals, a cathode selected from the group consisting of metal halides, metal sulfides and metal oxides, and an electrolyte of a solute comprising a complex of at least one Lewis acid and an inorganic ionizable salt selected from the group consisting of lithium fluoride, lithium chloride, lithium bromide, sodium fluoride, sodium chloride, sodium bromide, potassium fluoride, potassium chloride, and potassium bromide, dissolved in a solvent conforming to the general formula:

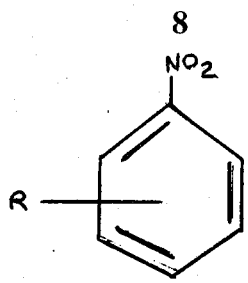

wherein R is selected from the group consisting of hydrogen, a halogen, an alkyl group of one to five carbon atoms, an alkoxy group of one to five carbon atoms, sulfur, an N-alkyl substituted amino group and a nitro group; said solvent being selected from the group consisting of nitrobenzene and substituted nitrobenzene compounds which exist in liquid form at ambient temperature and solid derivatives of nitrobenzene dissolved in an aromatic solvent.

2. The non-aqueous battery system of claim 1 wherein said anode is a metal is selected from the group consisting of lithium, sodium and potassium.

3. The non-aqueous battery system of claim 1 wherein said anode is lithium monoaluminide.

4. The non-aqueous battery system of claim 1 wherein said solvent is nitrobenzene.

5. The non-aqueous battery system of claim 1 wherein said anode is lithium metal, said cathode is nickel fluoride, and said electrolyte is a solution of lithium aluminum tetrachloride in nitrobenzene.

6. The non-aqueous battery system of claim 1 wherein said anode is lithium metal, said cathode is mononickel oxide and said electrolyte is a solution of lithium aluminum tetrachloride in nitrobenzene.

7. The non-aqueous battery system of claim 1 wherein said anode is lithium metal, said cathode is cupric sulfide and said electrolyte is a solution of lithium aluminum tetrachloride in nitrobenzene.

8. The non-aqueous battery system of claim 1 wherein said anode is lithium metal, said cathode is silver chloride and said electrolyte is a solution of lithium aluminum tetrachloride in nitrobenzene.

9. The non-aqueous battery system of claim 1 wherein said anode is lithium metal, said cathode is lead chloride and said electrolyte is a solution of lithium aluminum tetrachloride in nitrobenzene.

10. The non-aqueous battery system of claim 1 wherein said anode is lithium metal, said cathode is cuprous chloride and said electrolyte is a solution of lithium aluminum tetrachloride in nitrobenzene.

11. The non-aqueous battery system of claim 1 wherein said anode is lithium metal, said cathode is cupric fluoride and said electrolyte is a solution of lithium aluminum tetrachloride in nitrobenzene.

12. A hermetically sealed non-aqueous battery system comprising a highly active anode selected from the group consisting of the alkali metals, alkaline earth metals and alloys of alkali metals and alkaline earth metals with one another or other metals, a cathode selected from the group consisting of metal halides, metal sulfides and metal oxides, and an electrolyte of a solute comprising a complex of at least one Lewis acid and an inorganic ionizable salt selected from the group consisting of: lithium fluoride, lithium chloride, lithium bromide, sodium fluoride, sodium chloride, sodium bromide, potassium fluoride, potassium chloride and potassium bromide, dissolved in a solvent selected from the group consisting of nitrobenzene, 2-nitrotoluene, p-methylisopropyl nitrobenzene, o-chloronitrobenzene and p-fluoronitrobenzene, the latter two being dissolved in an aromatic solvent; said solvents being the only solvents for said complex solute.

* * * * *